3,188,325
16α-HYDROXY-STEROIDS

Alba Maria Amici, Via Morigi 13; Maria Luisa Bianchi, Via S. Eufemia 2; Renato Modelli, Via E. Filiberto 4; Celestino Spalla, Via Tagiura 16; Aurelio di Marco, Via Argenta 10; and Marcello Gaetani, Largo Rio de Janeiro 5, all of Milan, Italy
No Drawing. Filed July 13, 1962, Ser. No. 209,784
Claims priority, application Italy, July 17, 1961, 13,227/61; Mar. 14, 1962, 5,088/62
5 Claims. (Cl. 260—397.4)

Our invention relates to a new method for the preparation of 16α-hydroxy-steroids and to new therapeutically useful products obtained thereby. Our invention has as an object a microbiological process to introduce a hydroxy group into the 16α-position of a steroid molecule, using the new microorganism Nocardia italica n.sp. A further object is the providing of some new 16α-hydroxy-17α-methyl-androstenols of the normal and 19-nor-series, obtained by the process of the invention.

16α-hydroxy-steroids, which are well known in the literature both as intermediates for preparing therapeutically useful substances and as products having a high antiphlogistic activity, are prepared by employing some microorganisms. The most important of these microorganisms are: Streptomyces roseocromogenus (South African patent application No. 3300/58), Streptomyces ATCC 13278 and Streptomyces ATCC 13279 (Indian Patents No. 67,019 and No. 69,056), Streptomyces viridis, Streptomyces olivaceus, Streptomyces argenteolus (U.S. Patents No. 2,709,705 and No. 2,855,343). The literature reports other strains able to hydroxylate the 16α-position, namely Actinomyces lavendulae, Pestallotia funerea, Didimella vodakii, and Streptomyces mediocidicus, Streptomyces halstedii.

The new microorganism employed in the process of the present invention, named Nocardia italica n.sp., which has been deposited with the National Collection of Industrial Bacteria receiving the index number N.C.I.B. 9386 and at the Institute of Microbiology of Rutgers University receiving the number 3856, belongs to the genus Nocardia Trevisan whose capacity of hydroxylating a steroid in the 16α-position has been hitherto unknown. The use of Nocardia itlacia gives high transformation yields (70–80%) and high steroid concentration (0.1%) in the culture broth.

DESCRIPTION AND IDENTIFICATION OF THE STRAIN

The new microorganism Nocardia italica isolated from a soil sample has the following morphologic, cultural and biochemical characteristics.

On the usual culture media, the microorganism forms at first a spread-out mycelium with very branched, non-septate hyphae. After 3–4 days the formation of transversal septa is observed and afterwards the mycelium fragments into portions having various shapes and lengths (4–8μ). The hyphae thickness ranges from 0.5 to 0.7μ. On liquid media, the fragmentation occurs within 2 or 3 days; V and Y forms are frequent, while coccoid forms are absent. No aerial mycelium is observed in any medium. The mycelium is gram-positive and partially acid fast.

In the following table the cultural characteristics are reported; the observations have been carried out after 10–15–20–25 days of incubation at 28° C. The cultures have been repeated six times for each type of medium.

*Table I*

| Culture medium | Vegetative mycelium | | Soluble pigments | Remarks |
|---|---|---|---|---|
| | Growth | Color | | |
| Czapek agar | Slight | Colorless | | |
| Yeast agar | Abundant wrinkled growth | Yellowish | | |
| Malt agar | do | do | | |
| Potato agar | Abundant growth with relieved folds. | Egg-yellowish | | |
| Jensen agar | Scattered small colonies | Colorless | | |
| Nutritive agar with glycerol. | Abundant, wrinkled, pasty consistence. | Egg-yellowish | Slighty yellowish | |
| Bennet agar | Abundant wrinkled growth, pasty consistence. | Orange-yellowish | | |
| Glucose asparagine agar | Good, uniform growth, pasty consistence. | Egg-yellowish | | |
| Sabouraud agar | Abundant, wrinkled growth, pasty consistence. | Brown-yellowish | (Light-brown) | |
| Starch agar | Good, uniform | Orange | | It hydrolyzes abundantly. |
| Yeast broth | Flaky colonies at the bottom. | Yellowish | | |
| Peptone broth with potassium nitrate. | Flaky colonies at the bottom end. | | | Nitrates not reduced. |
| Potato plugs | Abundant with large folds | Egg-yellowish | | |
| Milk | Slight ring-pellicle | Yellowish | | Peptonization and coagulation in 15 days. |
| Gelatine | Scant small colonies at the bottom. | | | Slight fluidification. |

The biochemical characteristics of the microorganism Nocardia italica are the following:

Gelatine: slow and slight fluidification;
Nitrates: no reduction to nitrites;
Milk: coagulation and peptonization;
Starch: abundant hydrolysis; and
Acids production: positive from maltose, d-xylose, d-mannose, mannitol, glycerol, glucose, levulose; negative from lactose, adonitol, d-sorbitol, l-arabinose, saccharose, trehalose, reffinose, esculine.

The description of the tested microorganism corresponds to that of the genus Nocardia Trevisan, which has been referred to in Bergey's Manual of Determinative Bacteriology (seventh edition, 1957, pages 713–715), so that we may conclude that the microorganisms of the present invention belongs to the genus Nocardia Trevisan.

The analytic key of the species of genus Nocardia Waksman and Henrici (Waksman and Lechevalier: Guide to the classification and identification of the Actinomycetes and their antibiotics, 1953) indicates for the microorganism a systematic position close to Nocardia flava (Krassilnikev, 1938) Waksman and Henrici, 1948, from which it differs, however, because it is partially acid-resistant, because it liquefies gelatine and peptonizes milk and because the mycelium does not form coccoid fragments. It is also close to *Nocardia lutea* (Christopherson and Archibald, 1918), from which it differs, however, because it liquefies gelatine, does not show pink or red colored mycelium is any tested media and does not form aerial mycelium on potato plugs. Therefore, we conclude that the tested microorganism has neither been isolated nor described before.

The stock cultures of *N. italica* may be stored by lyophylization, milk or milk serum being the suspending medium. It may also be kept by succesive transfers on glucose potato agar.

Our invention provides a microbiological process of preparing 16α-hydroxy-steroids which comprises treating a steroid compound having a methylenic group in the 16-position with a culture produced by fermenting the new microorganism *Nocardia italica* n.sp. or a mutant thereof in a sterilized liquid nutritional medium containing assimilable sources of carbon and nitrogen at from 24 to 30° C. at a pH of from 6 to 7.5, and extracting the 16α-hydroxy-steroid produced.

The process of our invention may be applied to a great number of steroid compounds, more generally to all steroid compounds having from 19 to 21 carbon atoms which may contain in their molecules, for example, one or more double bonds in the 1-, 4-, 6- or 9 (11) -positions, halogen atoms in the 6- or 9-position, one or more hydroxy or alkoxy groups in the 9-, 11-, 17- or 21-positions, one or more keto groups in the 3-, 11-, 17- or 20-positions, one or more alkyl groups in the 6- or 17-positions.

The new compounds of the invention are:
16α-hydroxy-steroids of the general formula:

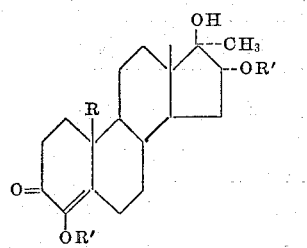

wherein R is hydrogen or methyl; and R' is hydrogen or a radical of an aliphatic, cycloaliphatic or aromatic acid having from 1 to 9 carbon atoms.

Typical examples of steroid compounds which can be subjected to the fermentative process by using *N. italica* are: progesterone, cortisone, hydrocortisone, testosterone, Reichstein's Compound S, desoxycorticosterone, 9α-fluoro-hydrocortisone, 9α-fluoro-prednisolone, 4-androstene-3,17-dione, 9α-chloro-hydrocortisone, 9α-bromo-hydrocortisone, 11-epi-hydrocortisone, 9α-fluoro-cortisone, 9α-methoxy-cortisone, 6α-fluoro-hydrocortisone, 6α-methyl-hydrocortisone, 4,6 - pregnadiene - 11β,17α,21 -triol-3,20-dione, 17α-methyl-19-nor-testosterone, 4-hydroxy-17α-methyl-testosterone, 4-hydroxy-17α-methyl-19-nor-testosterone.

The process of our invention introduces a hydroxy group into the 16α-position of steroids and consists in fermenting *N. italica* in suitable media and conditions, and submitting the starting 16-desoxy-steroid to the action of the microorganism or to the enzymes thereof. Said steroid may be added to the cultures either at the beginning, or during or a the end of growth, either in crystalline form or dissolved in suitable solvents such as methyl alcohol, ethyl alcohol, acetone or dimethylformamide for example.

The culture media consist of a source of carbon, of nitrogen and of inorganic salts. The carbon source may be constituted by starch, dextrin, saccharose, glucose, maltose, glycerin, vegetable oils, cereal or legume flour, corn steep liquor and/or other substances usually employed. The nitrogen source, besides the above-cited complex substances containing nitrogen, may be constituted by casein, ammonia salts, peptones, meat- and fish-flour or other substances usually employed. The inorganic salts may be sodium, potassium, magnesium, sulfates, phosphates, chlorides and calcium carbonate. It is also useful to add surfactants, such as available under the trademarks Tween 80 and Span.

The microorganism grows in submerged and aerated conditions, in shake flasks or in fermenters at a temperature ranging from 24° and 30°, preferably at 28° C. The pH of the medium should range between 6 and 7.5, preferably at 6.8. During fermentation the pH is quite constant.

The transformation of the starting 16-desoxy-steroid into the corresponding 16α-hydroxy-derivative during fermentation is checked by chromatography on thin layers. The chromatography on thin layers is described in the literature by Egon Stahl (Pharmac. Weekblad, 92, 1957, page 829; Chemiker Ztg., 82, 1958, page 323) and by N. J. D. Van Dam et al. (J. Chromatography 4, 1960, page 26). Chromatography on thin layers is also very suitable for a quantitative analysis by comparing the spot intensity with that of standard steroid solution of known concentrations. The steroid substance contained in the culture broth (both the reacted products and the unreacted starting material) is recovered by known extraction processes. Preferably the extraction is carried out in the following manner.

The fermentation broth is mixed with a siliceous earth material, such as Supercel or Celite (registered trademarks) and the resulting mixture is warmed up to 50°–60° C. for a few minutes, whereupon the whole is filtered, and the filtration cake is washed with water at 50° C. and discarded. The filtrate is extracted with an organic solvent, such as ethyl acetate, chloroform or methylene dichloride, the extracts are combined and washed with a saturated solution of sodium bicarbonate, then with water to neutrality. The solvent is evaporated and the transformaion product is recovered in the usual manner. The transformation product often crystallizes during concentration. It may be convenient to recrystallize the residue from acetone-petroleum ether or from other organic solvents. In other cases, column chromatography over silica gel may be used to obtain the compound in pure form.

Instead of submitting the crude products of the present invention to the above-cited purifying process, they may be acylated in 4,16-position or in the 16-position with the anhydride or the chloride of an aliphatic-, cycloaliphatic-, aromatic-acid having from 1 to 9 carbon atoms in the optional presence of tertiary amines such as pyridine or the analogues thereof, dimethylaniline, trimethylamine, and then they are isolated and purified. Typical examples of acyl derivatives, prepared according to the present invention, are the derivatives of the following acids: acetic, propionic, cyclopentylpropionic, benzoic, phenylpropionic.

We have also found, and this is still a further object of our invention, that submitting some 17α-methyl-androstenols of the normal and 19-nor-series to the above-mentioned fermenting process with *Nocardia italica* n.sp., the androgenic properties of the starting 16-desoxy-steroid are so remarkably reduced as to make them negligible, while the 16α-hydroxy-steroids obtained show a remarkable activity in inhibiting the experimental tumors.

The products of the invention which have proved useful in the therapy of tumors are: 4,16α-dihydroxy-17α-methyl-testosterone and its 4,16-diacyl-derivatives, 4,16-dihydroxy-17α-methyl-19-nor-testosterone and its 4,16-diacyl-derivatives, 16α - hydroxy - 17α - methyl - 19 - nor-testosterone and its 16-acyl-derivatives. The starting 16-desoxy-steroid for the preparation of 4,16α-dihydroxy-17α - methyl - testosterone is 4 - hydroxy - 17α - methyl-testosterone (described in the British Patent No. 848,288), while the starting 16-desoxy-steroid for the preparation of 4,16α - dihydroxy - 17α - methyl - 19 - nor - testosterone is 4-hydroxy-17α-methyl-19-nor-testosterone (described in the British Patent No. 888,665) and the 16- desoxy-steroid for the preparation of 16α-hydroxy-17α-methyl-19-nor-testosterone is 17α-methyl-19-nor-testosterone. Among the above-mentioned compounds the only product known in the literature is 16α-hydroxy-17α-methyl-19-nor-testosterone, described by Seymour and E. W. Cantrall (J. Org. Chem., 26, 1961, page 3560), who report only a very weak androgenic property but without any mention of an anticancer power.

These products have an anticancer activity and have shown especially valuable in inhibiting Ehrlich's adenocarcinoma and Ehrlich's ascitis tumor in mice. As will be further demonstrated, the products of the present invention, administered to mice, inoculated with Ehrlich's adenocarcinoma or Ehrlich's ascitis tumor cause the regression of tumor without any deleterious effect. They are administered preferably by a subcutaneous route as a suspension or solution in a suitable organic diluent such as polyethylene glycols, mineral oils, complex esters and tensioactive.

The following examples serve to illustrate, but are not intended to limit, the present invention.

EXAMPLE 1

A culture of *N. italica* aged 5 days on glucose-potato-agar was employed to inoculate two 300 cc. Erlenmeyer flasks each containing 60 cc. of the following medium:

| | |
|---|---|
| Casein _____g__ | 2 |
| Dextrin _____g__ | 20 |
| Corn steep _____g__ | 3 |
| Calcium carbonate, $CaCO_3$ _____g__ | 4 |
| Ammonium sulfate $(NH_4)_2SO_4$ _____g__ | 1 |
| Potassium hydrogen phosphate, $K_2HPO_4$ _____g__ | 0.1 |
| Glucose _____g__ | 10 |
| Tap water _____g__ | 1000 |
| pH | 6.6 |

Sterilization: 120° C. for 20 minutes.

The flasks were incubated at 28° C. for 40 hours on a rotary shaker with a range of 6 cm. at 220 r.p.m. 6 cc. of the culture thus obtained were used to inoculate ten 300 cc. flasks, each containing 60 cc. of the following medium:

| | |
|---|---|
| Casein _____g__ | 2 |
| Dextrin _____g__ | 20 |
| Corn steep _____g__ | 15 |
| Calcium carbonate, $CaCO_3$ _____g__ | 4 |
| Ammonium sulfate $(NH_4)_2SO_4$ _____g__ | 1 |
| Potassium hydrogen phosphate, $K_2HPO_4$ _____g__ | 0.1 |
| Glucose _____g__ | 10 |
| Tween 80 _____cc__ | 0.5 |
| Soya oil _____cc__ | 20 |
| Tap water _____cc__ | 1000 |
| pH | 6.6 |

Sterilization: 120° C. for 30 minutes.

60 mg. of 9α-fluoro-hydrocortisone, dissolved in 0.5 cc. of dimethylformamide were then added to the flasks. The flasks were incubated at 28° C. on a rotary shaker similar to that described for the preparation of the vegetative culture.

A chromatogarphic test, carried out after 3 days of incubation, showed the disappearance of the starting product and the formation of a product having an Rf equal to that of 16α-hydroxy-9α-fluoro-hydrocortisone. The contents of the flasks were then combined, and 100 g. of Celite were added thereto and the resulting mass was warmed up to 60° C. with stirring for 10 minutes. The mycelium cake was then filtered and washed with 100 cc. of water at 60° C. The filtrate was extracted 3 times with ethyl acetate. The ethyl acetate extracts were combined, washed once with a saturated solution of sodium bicarbonate, then twice with distilled water. The organic extract was evaporated in vacuo to reduce the volume to about 150 cc. of residual solution, which was transferred into a smaller flask and evaporated to a volume of 30 cc.; at this stage an abundant crystallization took place. The flask was kept in a refrigerator for 20 hours, then the product was filtered and washed with cold ethyl acetate. 0.460 g. of 16α-hydroxy-9α-fluoro-hydrocortisone were obtained, melting at 240–245° C.; $[\alpha]_D^{22}=+100°$ (c.=1 in methanol).

Upon recrystallization from methanol ethyl acetate, 0.400 g. of 16α-hydroxy-9α-fluoro-hydrocortisone were obtained, melting at 248–250° C.; $[\alpha]_D^{22}=+105°$ (c.=1 in methanol). Yields 80%.

EXAMPLE 2

The fermentation was carried out as in Example 1 while using a medium of the following composition:

| | |
|---|---|
| Distiller's solubles _____g__ | 10 |
| Meat extract _____g__ | 5 |
| Sodium chloride, NaCl _____g__ | 2.5 |
| Glucose _____g__ | 15 |
| Emulsifier, Tween 80 _____cc__ | 0.5 |
| Tap water _____cc__ | 1000 |
| pH | 6.7 |

Sterilization: 120° C. for 20 minutes.

A chromatographic test showed the disappearance of the starting product after 4 days of incubation. A product with an Rf equal to that of 16α-hydroxy-9α-fluoro-hydrocortisone was obtained. Extraction with ethyl acetate and subsequent concentration until crystallization begins to give pure 16α-hydroxy-9α-fluoro-hydrocortisone in a yield of 75%.

EXAMPLE 3

3 liters of the vegetative medium as in Example 1 were sterilized at 120° C. for 60 minutes in a 5 l. laboratory fermenter. They were then inoculated with 30 cc. of culture broth in a flask as described in Example 1 and thereafter incubated for 24 hours at 28° C. with stirring with a four-paddle propeller at a rate of 400 r.p.m. and at an aerating rate of 3 liters per minute.

5.4 liters of the fermentation medium as described in Example 1 are sterilized in a 10 l. laboratory fermenter and inocualted with 600 cc. of vegetative medium. 6 g. of 9α-fluoro-hydrocortisone dissolved in 35 cc. of dimethylformamide were added under sterile conditions to the medium and incubated at 28° C. with stirring with a four-paddle propeller at a rate of 450 r.p.m. and under an aerating rate of 5 liters per minute.

A chromatographic test showed the disappearance of the starting compound after 65 hours of fermentation. Extraction with ethyl acetate and subsequent concentration gave 16α-hydroxy-9α-fluoro-hydrocortisone in a yield of 80%.

EXAMPLE 4

The fermentation was carried out as in Example 1 using 9α-fluoro-prednisolone as the starting material. As soon as the chromatographic test showed that 9α-fluoro-prednisolone was completely transformed, the usual extraction was performed, whereby 16α-hydroxy-9α-fluoro-prednisolone melting at 248–250° C. was obtained. On recrystallization from ethyl acetate-methanol the pure product melting at 260–262° C. was obtained. $[\alpha]_D^{22}=+68°$ (c.=1 in methanol).

EXAMPLE 5

The fermentation was carried out as in Example 1 by employing 60 mg. of hydrocortisone as the starting steroid. 16α-hydroxy-hydrocortisone melting at 225–230° C. (crystallized from ethyl acetate) was obtained; $[\alpha]_D^{22}=+112°$ (c.=1 in methanol). On recrystallization from ethyl acetate 16α-hydroxy-hydrocortisone melting at 232–235° C. was obtained.

EXAMPLE 6

The fermentation was carried out as in Example 1 using progesterone (60 mg.) as the starting steroid. On recrystallization from ethyl acetate 16α-hydroxy-progesterone melting at 212–214° C. was obtained. $[\alpha]_D^{22}=+43°$ (c.=1 in chloroform).

EXAMPLE 7

The fermentation was carried out as in Example 1 using 60 mg. of testosterone. After the extraction the product was chromatographed over a silica gel column by elution with ether containing 5% of acetone to give 16α-hydroxy-testosterone, melting at 182–184° C.; $[\alpha]_D^{22}=+75°$ (c.=1 in methanol).

EXAMPLE 8

The fermentation was carried out as in Example 1 using Reichstein's Compound S as the starting material. Upon extraction with ethyl acetate, evaporation to dryness and crystallization from acetone-ether 4-pregnen-16α,17α,21-triol-3,20-dione was obtained; melting point 235°–240° C.; $[\alpha]_D^{22}=+93°$ (c.=1 in methanol).

EXAMPLE 9

The fermentation was carried out as in Example 1, using 60 mg. of desoxycorticosterone as the starting material. Upon extraction with ethyl acetate and concentration to a small volume, 16α-hydroxy-desoxycorticosterone separated; melting point 180–190° C.

On crystallization from dichloroethane pure 16α-hydroxy-desoxycorticosterone melting at 202°–204° C. was obtained; $[\alpha]_D^{22}=+112°$ (c.= 1 in methanol).

EXAMPLE 10

The fermentation was carried out as in Example 1 using 60 mg. of desoxycorticosterone acetate as the starting material. Upon extraction with ethyl acetate and crystallization from dichloroethane, 16α-hydroxy-desoxycorticosterone, melting at 202–204° C., was obtained. In this case, *Nocardia italica*, besides introducing a hydroxy group into the 16α-position, also saponified the 21-acetate-group.

EXAMPLE 11.—16α-HYDROXY-17α-METHYL-19-NOR-TESTOSTERONE

The fermentation was carried out as in Example 1, using 17α-methyl-19-nor-testosterone as the starting material. Upon extraction with ethyl acetate, evaporation to dryness and recrystallization from acetone-ethyl ether, 16α - hydroxy - 17α - methyl - 19 - nor - testosterone was obtained, melting at 205–208° C.; $[\alpha]_D^{20}=-7°$ (c.=1 in dioxane);

$\lambda_{max.}^{methanol}$ at 241 m$\mu$; $E_{1\,cm.}^{1\%}$ 524

EXAMPLE 12.—16α-HYDROXY-17α-METHYL-19-NOR-TESTOSTERONE

The preparation was carried out in the same way as in Example 11, differing only in the extraction technique. More exactly, the extraction of the fermentation broth was carried out with methyl-isobutyl-ketone without previously removing the mycelium, then by chromatographing the dry extract over Florisil, an activated magnesium silicate; 16α - hydroxy - 17α - methyl - 19 - nor - testosterone was eluted with ethyl-ether containing 10% of acetone. The 16α-acetyl-derivative, obtained in known manner with acetic anhydride in pyridine, melts at 177–180° C.; $[\alpha]_D^{20}=-17°$ (c.=1 in dioxane);

$\lambda_{max.}^{methanol}$ 240 m$\mu$; $E_{1\,cm.}^{1\%}$ 473

EXAMPLE 13.—4,16α-DIHYDROXY-17α-METHYL-TESTOSTERONE

The preparation was carried out in the same way as in Example 1, from 4-hydroxy-17α-methyl-testosterone. 4,16α - dihydroxy - 17α - methyl - testosterone was obtained, melting at 226–228° C.; $[\alpha]_D^{20}=+36.2$ (c.=1 in dioxane);

$\lambda_{max.}^{methanol}$ 277 m$\mu$; $E_{1\,cm.}^{1\%}$ 393

By reacting said compound with an acylating agent in known manner the corresponding 4,16-diacyl-derivatives were obtained. In this manner 4,16-diacetate, 4,16-dipropionate, 4,16-dibenzoate, and other 4,16-diacyl-derivatives were obtained.

EXAMPLE 14.—4,16α-DIHYDROXY-17α-METHYL-19-NOR-TESTOSTERONE

The preparation was carried out in the same way as in Example 1 from 4-hydroxy-17α-methyl-19-nor-testosterone. 4,16α - dihydroxy - 17α - methyl - 19 - nor - testosterone was obtained, which crystallized with difficulty. By acetylating with acetic anhydride in pyridine, in known manner, the corresponding 4,16α-diacetate was obtained, melting at 156–158° C.; $[\alpha]_D^{20}=-1°$ (c.=1 in dioxane);

$\lambda_{max.}^{methanol}$ at 246 m$\mu$; $E_{1\,cm.}^{1\%}$ 385

EXAMPLE 15.—PHARMACOLOGY

In the following table the androgenic and anticancer activities of 4,16α-dihydroxy-17α-methyl-19-nor-testosterone, of 4,16α-dihydroxy-17α-methyl-testosterone and of 16α-hydroxy-17α-methyl-19-nor-testosterone are reported in comparison with the starting 16-desoxy-steroids. Their androgenic activity was determined according to the method of Hershberger et al. (Proc. Soc. Exp. Biol. and Med., 83, 1953, page 175) and the anticancer activity was tested on Ehrlich's adenocarcinoma. The values of the androgenic activity are referred to testosterone propionate, conventionally taken as equal to 100, while the values of the anticancer activity are listed as percentage of inhibiting the increase of Ehrlich's adenocarcinoma.

The products were administered subcutaneously to mice as described above. The table shows that 16α-hydroxy-steroids, prepared according to the present invention, present a negligible androgenic activity and an anticancer activity remarkably higher than that of the starting 16-desoxy-steroids.

*Table II*

| Steroids | Activity | |
|---|---|---|
| | Androgenic | Anticancer |
| 4 - hydroxy - 17α - methyl - 19 - nor-testosterone. | 25 | 45.8%, 300 mg./kg./day×10 days. 39.2%, 225 mg./kg./day×6 days. |
| 4,16α - dihydroxy - 17α - methyl - 19-nor-testosterone. | Very slight | 37%, 135 mg./kg./day×7 days. |
| 4-hydroxy-17α-methyl-testosterone | 22.5 | 19.4%, 300 mg./kg./day×9 days. |
| 4,16α - dihydroxy - 17α - methyl-testosterone. | Very slight | 20%, 143 mg./kg./day×3 days. |
| 17α-methyl-19-nor-testosterone | 17.4 | 38.6%, 275 mg./kg./day×10 days. |
| 16α - hydroxy - 17α - methyl - 19 - nor - testosterone. | Very slight | 36.8%, 92.5 mg./kg./day×10 days. |

We claim:
1. Steroid compounds having the following formula:

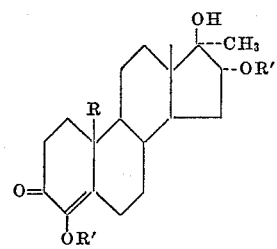

wherein R is selected from the group consisting of hydrogen and methyl; R' is selected from the group consisting of hydrogen and a radical selected from the group consisting of an aliphatic, cycloaliphatic and aromatic acid having from 1 to 9 carbon atoms.
2. 4,16α-dihydroxy-17α-methyl-testosterone.
3. 4,16α - dihydroxy - 17α - methyl - testosterone - 4,16-diacetate.
4. 4,16α-dihydroxy-17α-methyl-19-nor-testosterone.
5. 4,16α - dihydroxy - 17α - methyl - 19 - nor - testosterone-4,16-diacetate.

References Cited by the Examiner
UNITED STATES PATENTS

| | | | |
|---|---|---|---|
| 2,666,016 | 1/54 | Hechter et al. | 195—51 |
| 2,756,179 | 7/56 | Fried et al. | 195—51 |
| 2,936,312 | 5/60 | Babcock et al. | 260—397.4 |
| 2,937,192 | 5/60 | Colton | 260—397.4 |
| 3,031,445 | 4/62 | Szpilfogel et al. | 260—239.55 |

OTHER REFERENCES
Leeds et al.: J.A.C.S., 76, pp. 2943–48 (1954).

LEWIS GOTTS, *Primary Examiner*.
M. LIEBMAN, *Examiner*.